US007253933B1

(12) United States Patent
Efimov (10) Patent No.: US 7,253,933 B1
(45) Date of Patent: Aug. 7, 2007

(54) APPARATUS AND METHOD FOR THE TEMPORAL PROFILING OF SHORT LASER PULSES WITH THICK BRAGG GRATINGS

(75) Inventor: Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 281 days.

(21) Appl. No.: 11/054,733

(22) Filed: Feb. 10, 2005

(51) Int. Cl.
    *G02B 5/32* (2006.01)
(52) U.S. Cl. .................. 359/15; 359/569; 359/572; 385/37
(58) Field of Classification Search ................ 359/15, 359/569, 572; 385/37
    See application file for complete search history.

(56) References Cited

U.S. PATENT DOCUMENTS

| 3,826,561 | A | 7/1974 | Gregg |
| 5,864,430 | A | 1/1999 | Dickey et al. |
| 5,925,271 | A | 7/1999 | Pollack et al. |
| 6,285,813 | B1 * | 9/2001 | Schultz et al. ................. 385/37 |
| 6,421,390 | B1 | 7/2002 | Burkhart |
| 2002/0008091 | A1 | 1/2002 | Brandinger et al. |

FOREIGN PATENT DOCUMENTS

WO    WO 01/04685 A1    1/2001

OTHER PUBLICATIONS

Herwig Kogelnik, *Coupled Wave Theory for Thick Hologram Gratings*, The Bell System Technical Journal, Nov. 1969, pp. 2909-2945, vol. 48, No. 9, The American Telephone and Telegraph Company, New York.
K. Buse et al., *Origin of thermal fixing in photorefractive lithium niobate crystals*, The American Physical Society, Physical Review B, Jul. 15, 1997, pp. 1225-1235, vol. 56, No. 3.
S. Breer, K. Buse, *Wavelength demultiplexing with volume phase holograms in photorefractive lithium niobate*, Applied Physics B Laser and Optics, 1998, pp. 339-345.
M. Haner, W.S. Warren, *Synthesis of crafted optical pulses by time domain modulation in a fiber-grating compressor*, 1988 American Institute of Physics, Appl. Phys. Lett. 52(18), May 2, 1988, pp. 1458-1460.
A.M. Weiner et al., *High-resolution femtosecond pulse shaping*, 1988 Optical Society of America, vol. 5, No. 8/Aug. 1988/J. Opt. Soc. Am. B, pp. 1563-1572.
Oleg M. Efimov et al., *High-efficiency Bragg gratings in photothermorefractive glass*, Optical Society of America, Applied Optics, Feb. 1, 1999, vol. 38, No. 4, pp. 619-627.

* cited by examiner

*Primary Examiner*—Fayez G. Assaf
(74) *Attorney, Agent, or Firm*—Christie, Parker & Hale (57) ABSTRACT

A system and/or method for temporal profiling of an incident laser pulse. The system and/or method includes a laser beam source for providing the incident laser pulse and a Bragg grating (BG) coupled to receive the incident laser pulse. The BG includes a distribution of diffraction efficiency density at various depths within the BG and provides a plurality of diffracted beamlets from the incident laser pulse. The system and/or method combines the diffracted beamlets into a single temporally shaped laser beam.

23 Claims, 6 Drawing Sheets

APPARATUS AND METHOD FOR THE TEMPORAL PROFILING OF SHORT LASER PULSES WITH THICK BRAGG GRATINGS

FIELD OF THE INVENTION

The invention relates generally to the field of laser beam shaping and, more particularly, to a system and/or method that temporally profiles (or shapes) laser beams.

BACKGROUND OF THE INVENTION

Raw laser beams may be produced from a variety of mechanisms. It is known in the art that raw laser beams need to be temporally profiled in order to have proper applications in areas such as laser communications, laser signal processing, laser spectroscopy, laser inertial confinement fusion, etc. Typically, laser pulse shaping in the time or frequency domain is used for the temporal profiling of very short input laser pulses. In the case of longer pulses, the direct modulation of beam intensity using a Pockels cell (that alters the polarization state of light passing through it when an applied voltage induces birefringence changes in an electro-optic crystal) is employed.

In particular, a simple approach for temporal profiling of laser pulses includes the direct modulation of pulse intensity using a Pockels cell placed between two polarizing elements. In this approach, application of a temporally profiled electrical pulse to the Pockels cell results in a time-dependent attenuation of the input laser pulse. One example of a device exploiting such an approach is disclosed in U.S. Pat. No. 6,421,390, which is incorporated by reference herein in its entirety. A basic disadvantage of this approach is that it has limited capability to form optical pulses with special temporal profiles, especially with temporal profiles having relatively fast rising optical intensity.

Laser beam pulse shaping in the time domain can also be based on an approach that first temporally broadens a short laser pulse using a fiber, temporally profiles the broadened chirped pulse, and then compresses it using a grating pair to synthesize the desired pulse shape. An example of this approach is disclosed in M. Haner, W. S Warren. "Synthesis of crafted optical pulses by time domain modulation in a fiber-grating compressor," Appl. Phys. Lett., v. 52(18), 1458-1460, 1988, which is incorporated by reference herein in its entirety. This approach is used for generating voltage programmable and arbitrarily shaped laser pulses in subpicosecond durations. The disadvantage of this approach is that it is a three-stage process. The first stage is the creation of the chirped pulse. Then, this pulse is shaped by programmable microwave generator. Finally, it is compressed using a grating pair to synthesize the desired pulse shape. As such, this approach requires the use of complicated and expensive equipment (e.g., the microwave generator) to create the proper and accurate temporal shape of the desired laser pulse.

A. M. Weiner, J. P. Heritage, E. M. Kirschner. "High-resolution femtosecond pulse shaping," JOSA B, v. 5, 1563-1572, 1988, which is incorporated by reference herein in its entirety, discloses an approach based on spatially separating spectral components of a laser pulse and modifying the amplitudes and/or the phases of these components to produce the optical spectrum corresponding to the desired temporal pulse profile. Then, the spectral components are recombined to obtain the desired temporal shape of laser pulse. This approach can only be used to generate simple optical pulse profiles because it requires a very detailed and accurate modification of the amplitude-phase relation between the spectral components.

An additional disadvantage in each of the above-mentioned approaches is that these approaches result in large losses in total energy due to attenuation of the input pulses.

U.S. Pat. No. 3,826,561, which is incorporated by reference herein in its entirety, describes an approach for time-tailoring the intensity of focused laser beam pulse reflected from a reflector onto a focal region. This approach permits stepwise or continuous shaping in space and time which is accomplished by dividing up and reassembling portions of the laser beam. This approach has a basic disadvantage that it only allows temporal profiling of pulse intensity in the focal region. In addition, this approach has the further disadvantage that the different temporal parts of the pulse irradiate the focal region from different directions and that it requires complicated and expensive equipment to control and realize the needed temporal beam intensity.

In view of the above, it is desirable to provide a system and method for temporal shaping or profiling of laser beams that overcomes the above-described shortcomings while retaining their advantages. In particular, it would be desirable to provide a system and method that can realize practically any temporal output beam shape and/or any distribution of the beam intensity in time (e.g., longer than the input pulse duration) without requiring complicated controlling equipment, without big losses in beam power, and/or without requiring a special distribution of the intensity of the initial (incident, raw, or input) laser beam.

SUMMARY OF THE INVENTION

The invention relates to methods and associated systems for the temporal profiling of laser pulses or short laser pulses. The methods and systems are based on creating a special distribution of diffraction efficiency density along a thick Bragg grating (BG). Diffraction efficiency density is the limit of the ratio of diffraction efficiency of thin BG layer to the thickness of this layer when this thickness tends to zero. The distribution of diffraction efficiency density should be such that an incident laser pulse is diffracted from the different depths of the BG with varying efficiencies. The methods and systems provide different temporal delays of the diffracted beams relative to a beam diffracted from the beginning of the BG. Thus, a proper pattern of diffraction efficiency density distribution along the grating thickness is used to provide the needed temporal distribution of the diffracted beam intensity. As such, embodiments of the present invention can be used for temporal profiling of any laser pulses even very short laser pulses (e.g., pico- and subpicosecond).

In addition, an exemplary chirped BG of the present invention can provide both chirped laser pulses and a profiling of intensities of the laser pulses without using any active equipment. Moreover, because of the very narrow angular selectivity of BGs in the plane of beam diffraction, the spatial noises of the laser beam can be filtered or cleaned out. That is, the narrow angular selectivity of the BGs allows their use as spatial filters for excluding highly divergent components from an incident beam pulse.

One exemplary embodiment of the present invention provides a method for temporal beam profiling of an incident laser pulse from a source. The method includes: providing a Bragg grating (BG); directing the incident laser pulse into the BG; diffracting the incident laser pulse at various depths within the BG into a plurality of diffracted beamlets having a plurality of time delays; and combining the diffracted beamlets into a single temporally shaped laser beam. In this, method, the various depths within the BG include a distribution of diffraction efficiency density.

One exemplary embodiment of the present invention provides a system for temporal shaping of an incident laser pulse from a laser beam source. The system includes a Bragg grating (BG) and a fiber. The BG is coupled to receive the incident laser pulse from the laser beam source, has a height that is less than a physical length of the incident laser pulse, and produces a plurality of diffracted beamlets. The fiber is coupled to receive the diffracted beamlets and to combine the diffracted beamlets into a single temporally shaped laser beam from the incident laser pulse. In addition, the BG fragments the incident laser beam at various depths within the BG into the plurality diffracted beamlets. Each of the plurality of diffracted beamlets has a corresponding beam amplitude and the combination of the various beam amplitudes of the diffracted beamlets provides the temporal shaped laser beam.

A more complete understanding of the apparatus and method for the temporal profiling of short laser pulses with thick Bragg gratings will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The present invention is directed to systems and methods that temporally profile a raw laser beam by allowing an incident laser beam pulse to diffract into temporally profiled output beams and/or to fragment into various beamlets having various delays and intensities.

Embodiments of the present invention include a holographic or Bragg grating (BG) that receives an incident laser beam pulse and fragments the beam pulse into beamlets having various delays and intensities in accordance with the distribution of the diffraction efficiency density along the thickness of BG. The distribution of the diffraction efficiency density along the BG's thickness is used to provide a specified distribution of beam intensity in time and/or to provide different final pulse durations by making changes in the BG thickness.

A BG of the present invention is formed from material(s) that allow accurate variation of refractive index(es) and/or diffraction efficiency density(s) along the BG thickness. In one embodiment, a BG of the present invention can be made by exposing a photorefractive lithium niobate (e.g., S. Breer, K. Buse. "Wavelength demultiplexing with volume phase holograms in photorefractive lithium niobate," Appl. Phys. B, v. 66, pp. 339-345, 1998) to at least two laser beams to form a plurality of diffraction patterns. In another embodiment, a BG is made by exposing a photorefractive glass (e.g., O. M. Efimov, L. B. Glebov, L. N. Glebova, K. C. Richardson, and V. I. Smirnov. "High-efficiency Bragg gratings in photothermorefractive glass," Appl. Optics, Optical Technology and Biomedical Optics (OT&BO), v. 38, pp. 619-627, 1999) to UV laser light source followed by thermal development to form a volume phase hologram.

Figure 1:
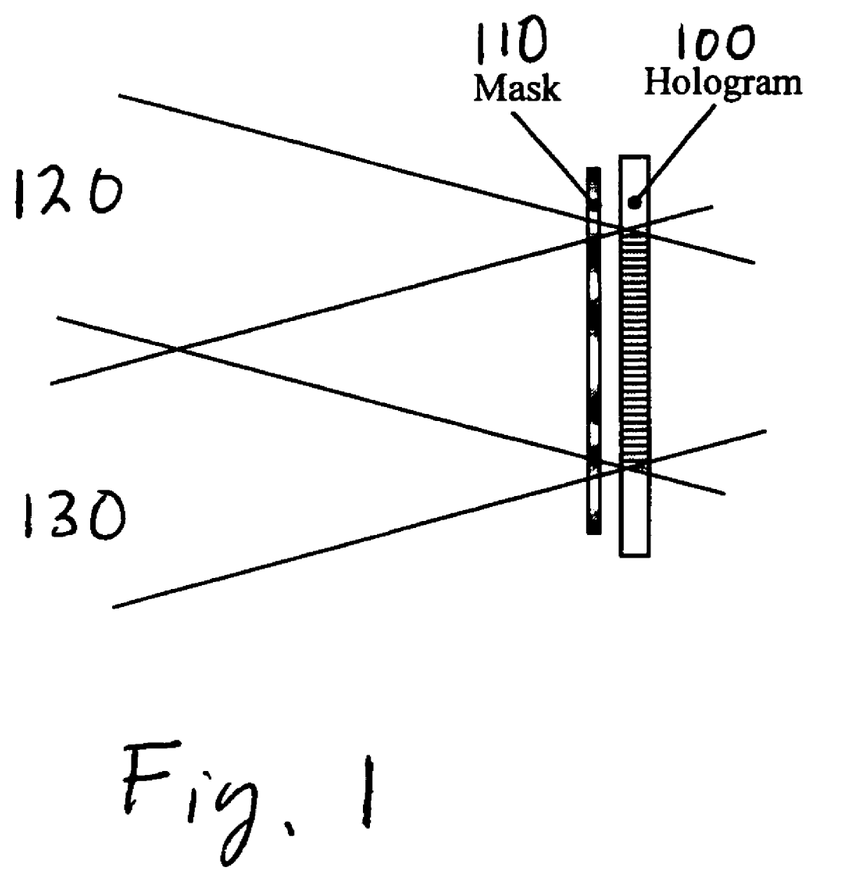
FIG. 1 is a schematic diagram of an exemplary embodiment for implementing refractive index modulation pursuant to aspects of the present invention.

Referring now to FIG. 1, an embodiment for implementing refractive index modulation during a recoding process is provided. The embodiment of FIG. 1 includes photosensitive material to record holographic grating or BG 100, first laser beam 120, second laser beam 130, and mask 110. Here, mask 110 is formed from a material having a proper distribution of absorption or reflection characteristics and is placed in front of BG 100 to modulate the exposure dosage of laser beams 120, 130 during the recording of BG 100 by laser beams 120, 130. As a result, the value of refractive index and/or diffraction efficiency density of BG 100 are also modulated.

The scope of the present invention, however, is not limited to the techniques and/or materials used to form or construct the above described BGs. Instead, all or some of the above described techniques and/or materials can be replaced by any suitable techniques and/or materials that are recognized by those skilled in the art.

Regardless of how a BG is formed, recorded, modulated, or constructed, embodiments of the present invention use the BG in a situation where a raw or incident laser beam pulse is diffracted into a temporally shaped output beam and/or fragmented into various beamlets having various delays and intensities by diffracting them from different depths within the BG, and then combining the beamlets in such a way as to provide a specified distribution of the beam intensity in time.

Figure 2A:
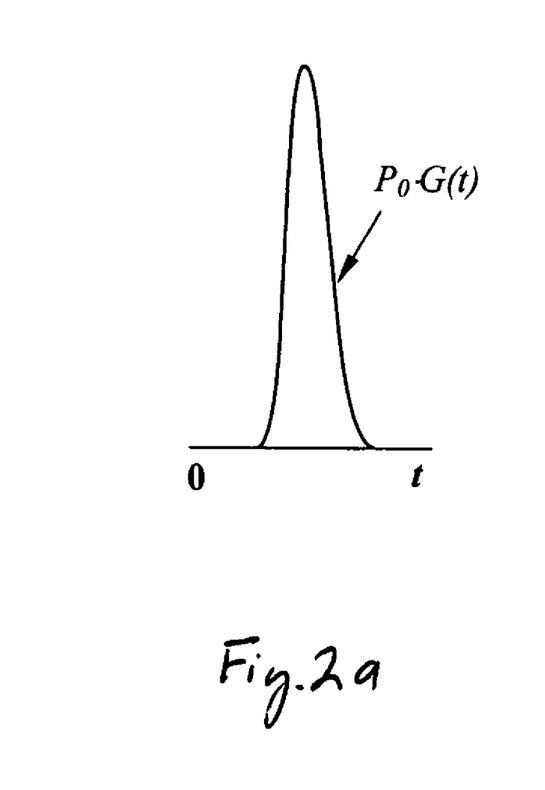
FIG. 2a is a temporal graph of a short laser pulse pursuant to aspects of the present invention.
Figure 2B:
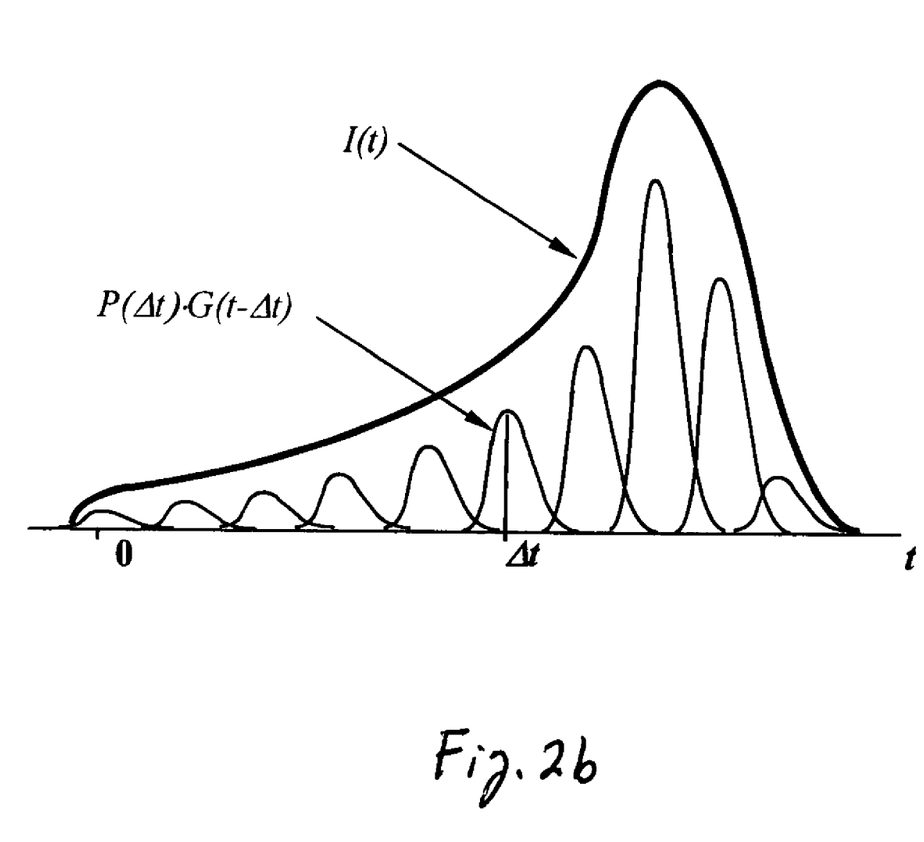
FIG. 2b is a temporal graph of an output transformed from the short laser pulse of FIG. 2a according to an exemplary embodiment of the present invention.

In particular, referring now to FIGS. 2a and 2b, an embodiment of the present invention includes a short input laser pulse with a temporal distribution of intensity $P_0 \cdot G(t)$ as is shown in FIG. 2a. The short laser pulse of FIG. 2a is to be transformed by the present embodiment into a number of output pulses with a specific temporal distribution of intensity $I(t)$ as is shown in FIG. 2b. To realize such a transformation, it is first necessary to split the input laser pulse into a number of separate pulses, next provide the proper delay $\Delta t$ and amplitude $P(\Delta t)$ for each single pulse, and finally combine them together again to form the specific temporal distribution of intensity $I(t)$ of FIG. 2b.

It should be apparent to those skilled in the art that the accuracy of temporal profiling increases with the number of output pulses. Mathematically, the best profiling occurs at the infinite limit of output pulses. In this case, to achieve the required temporal shape after pulse combination, it is necessary to find the function representing the dependence of pulse amplitude P on temporal delay Δt. Once this dependence P(Δt) is known, the output intensity can be expressed as a convolution of this function and the temporal profile function of the input pulse:

$$I(t) = \int_{-\infty}^{+\infty} P(\tau) \cdot G(t - \tau) d\tau. \quad (1)$$

Conversely, the function P(Δt) can be calculated rather accurately from this equation using numerical methods if the functions I(t) and G(t) are known. Thus, an exemplary embodiment of the present invention produces an array of the delayed pulses with appropriate amplitudes that accurately construct the required temporal profile I(t) of FIG. 2b.

Figure 3:
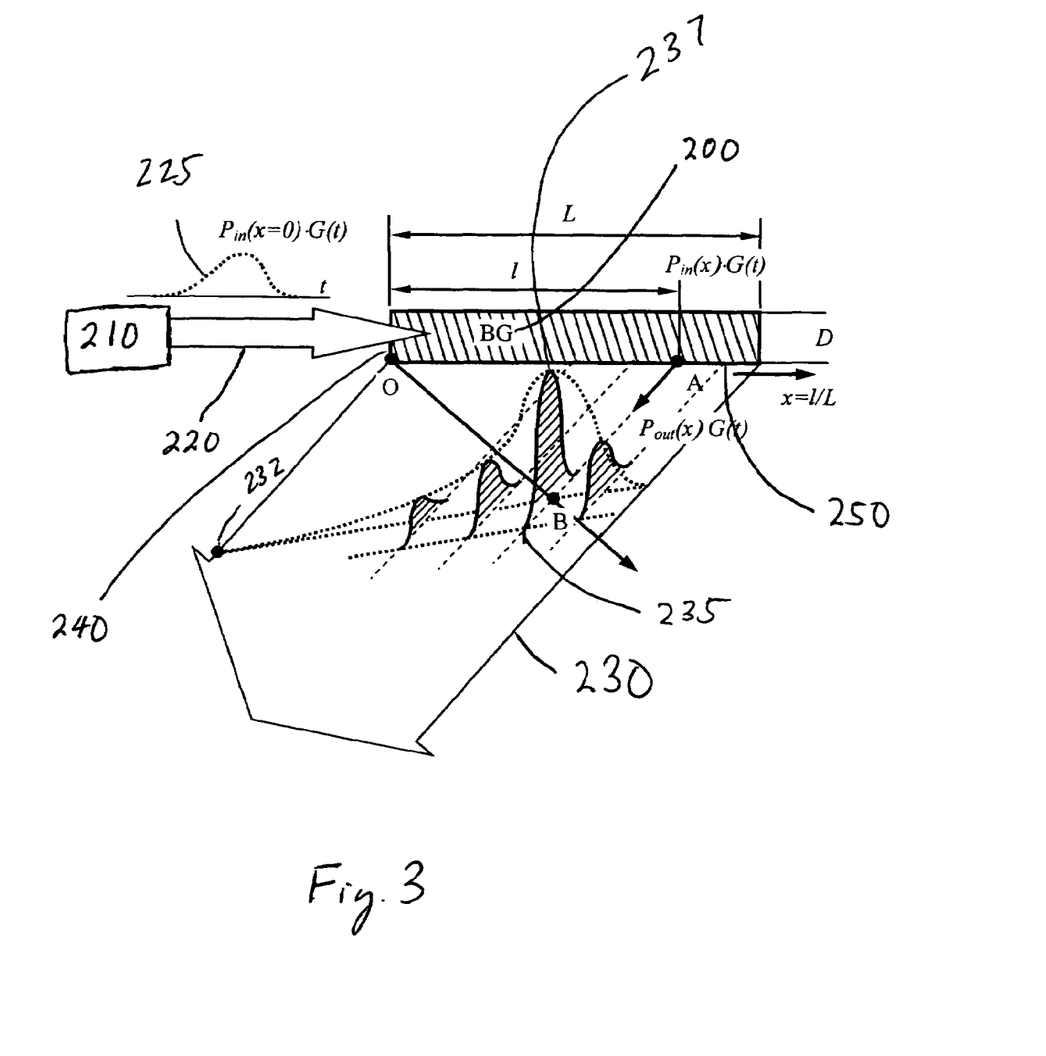
FIG. 3 is a schematic diagram of a thick Bragg grating (BG) temporal beam profiler according to an exemplary embodiment of the present invention.

Referring now to FIG. 3, an embodiment of the present invention includes a holographic or Bragg grating (BG) 200 and laser beam source 210 that provides input (or incident) laser beam 220. Laser beam 220 has a distribution of intensity in time, t, as represented by incident laser pulse 225. BG 200 has first side 240 and second side 250. In FIG. 3, input laser beam 220 is shown to enter BG 200 from first side 240, and temporally shaped beam 230 (including various output pulses) is shown to be diffracted from second side 250. The diffraction efficiency density of the BG 200 is changed according to the depth, l, of beam penetration along the beam propagation direction. The changes (or the distribution) of the diffraction efficiency density along the depth, l, can be achieved by creating the proper distribution of the grating refractive index modulation in accordance with H. Kogelnik's coupled wave theory as disclosed in The Bell System Technical Journal, v. 48, pp. 2909-2945, 1969, which is incorporated by reference herein in its entirety. However, the scope of the present invention is not limited by the above described wave theory and/or technique and those skilled in the art would recognize that the diffraction efficiency density may be varied by other suitable wave theories and/or techniques.

In the embodiment of FIG. 3, the physical length of input laser pulse 225, t, should be considerably greater (or longer) than the BG height, D. In this case, the temporal profile of pulse (or beamlet) 235 diffracted at the depth, l, is almost identical to input pulse 225 while the diffraction efficiency density around the depth, l, defines its amplitude 237. At the same time, pulse 235 gets a delay, Δt, relative to pulse 232 (shown as point 232) diffracted from the beginning of BG 200. If BG 200 were recorded in a material with a refractive index, n, the delay, Δt, is equal to $$\Delta t = \frac{OA \cdot n + AB}{c} = \frac{l}{L} \cdot \frac{L(n + \cos\alpha)}{c} \quad (2)$$

where, α, is the angle between the input and diffracted beams, c, is the light speed in the vacuum, L, is a total length of the grating, OA, is a straight line distance from point O to point A, and, AB, is a straight line distance from point A to point B. Thus, BG 200 provides continuous beam splitting into beamlets with different delays defined by the implementation of BG 200 and with amplitudes defined by the diffraction efficiency density distribution along the BG thickness. In other words, the proper distribution of the grating diffraction efficiency density along the thickness of BG 200 provides an exemplary method to produce an array of the delayed pulses (e.g., pulses 232, 235) with appropriate amplitudes (e.g., amplitude 237), and the resultant combination of the beamlets into one beam 230 gives the required result.

The embodiment shown in FIG. 3 provides several distinct advantages over the previously discussed prior approaches for temporal shaping of a laser input beam. For example, if a BG is a phase grating and it is recorded in a material with low absorption and scattering, the efficiency of transforming the input beam into a beam with a specified intensity distribution can be close to 100%. In addition, the time duration of the output beam can be varied over a very wide range by changing the total length of the BG and the angle between the input and diffracted beams. Finally, because the whole input beam is involved in the diffraction process, the intensity distribution in the diffracted beam weakly depends on the intensity distribution across the input beam.

Referring now back to FIG. 3, to describe the distribution of a BG's diffraction efficiency density along its thickness, an embodiment of the present invention defines this value as H(l)=η(l)/Δl, where, η(l), is the diffraction efficiency of the layer with a thickness, Δl, placed on a depth, l, of BG 200, as described in patent application Ser. No. 11/054,730, now U.S. Pat. No. 7,088,483, entitled Holographic Spatial Laser Beam Shaper And Method, filed on Feb. 10, 2005, and assigned to the assignee of the present application, the entire contents of which are incorporated herein by reference. In an embodiment of the present invention, the concept "diffraction efficiency" should be applied only to a BG with a definite thickness and should not be used irrespective of it. Based on this concept, the diffraction efficiency density distribution, H(x), can be determined if the specified intensity distribution, f(x), along a non-dimensional depth, x=l/L, of BG 200 or along a non-dimensional coordinate, y, across the resulting beam 230 is known (note: the result should be the same because y∝x). That is:

$$P_{out}(x) = k \cdot f(x)$$

where, k, is a constant and, f(x), is a functional dependence. The dependence can be expressed in terms of the above-mentioned value, P(Δt). If the maximum time delay in Eq. (2) is denoted as $$T = \frac{L(n + \cos\alpha)}{c} \quad (4)$$

then $$\Delta t = \frac{l}{L} T = xT \quad (5)$$

$$f(x) = P(Tx)$$

The constant, k, can be found from the normalizing condition:

$$k \cdot \int_0^1 f(x)dx = P_{in}(0) \qquad (6)$$

$$k = \frac{P_{in}(0)}{\int_0^1 f(x)dx}$$

It follows that the input beam power at the depth, x, of the grating is $$P_{in}(x) = P_{in}(0) - k \cdot \int_0^x f(x')dx' \qquad (7)$$

$$P_{in}(x) = P_{in}(0) \cdot \left(1 - \frac{\int_0^x f(x')dx'}{\int_0^1 f(x')dx'}\right)$$

Finally, the distribution of the diffraction efficiency density along the grating thickness is found from the ratio:

$$H(x) = \frac{P_{out}(x)}{P_{in}(x)} \qquad (8)$$

$$H(x) = \frac{f(x)}{\int_0^1 f(x')dx' - \int_0^x f(x')dx'}$$

As such, the diffraction efficiency density in the embodiment of FIG. 3 can be defined (or solely defined) by the functional dependence of the target distribution across beam 220.

As such, it can be seen in FIG. 3 that all the diffracted beams or beamlets (e.g., beamlet 235) with the different amplitudes (e.g., amplitude 237) are separated temporally and spatially. The usage of resultant beam 230 having the spatially separated beamlets may be inconvenient for some applications. To overcome this circumstance, an embodiment of the present invention includes a converter for combining the spatially separated beamlets.

Figure 4:
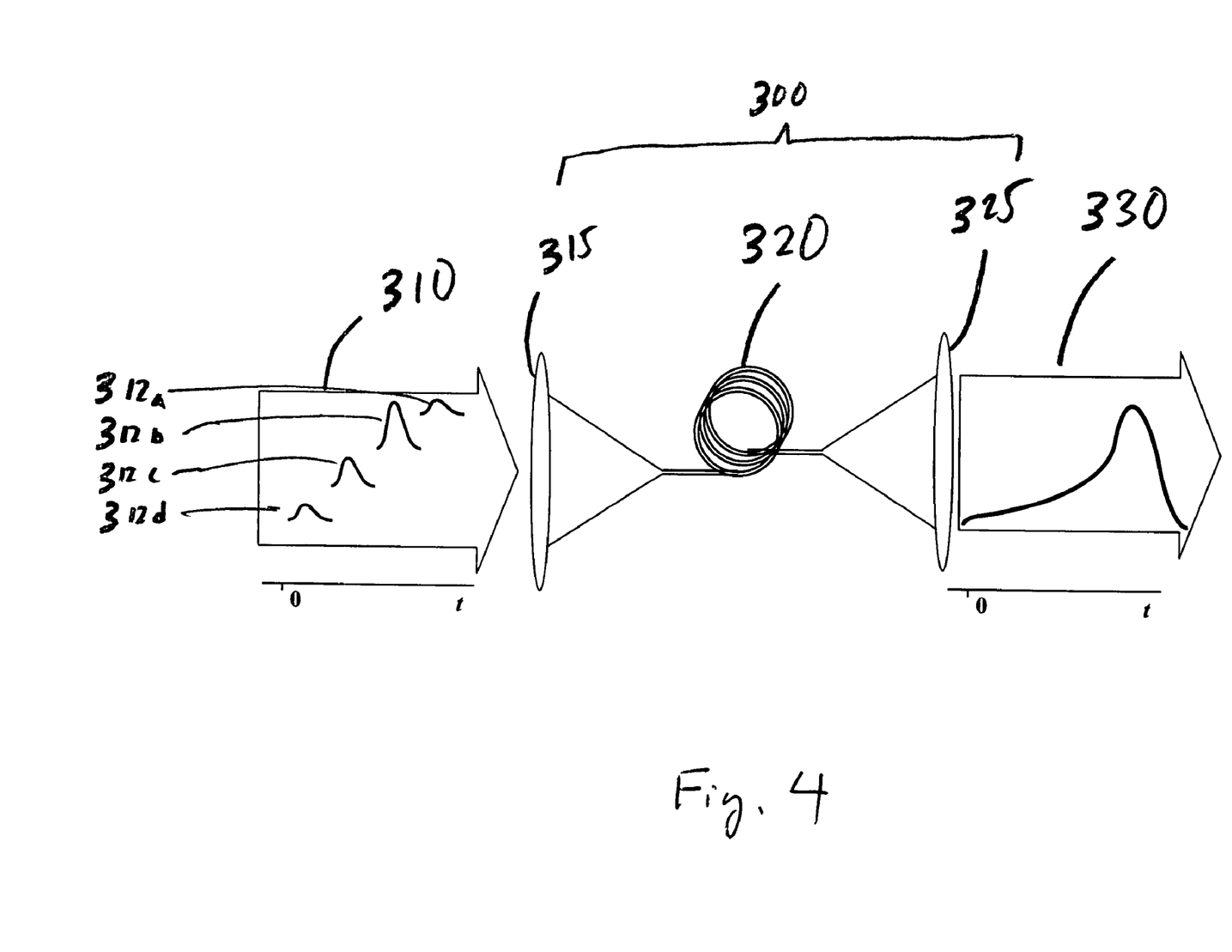
FIG. 4 is a schematic diagram of a converter for combing a plurality of beamlets and having a fiber according to an exemplary embodiment of the present invention.

In particular, referring now to FIG. 4, an embodiment of the present invention includes converter 300 having fiber 320 coupled between input lens 315 and output lens 325. In FIG. 4, input beam 310 is a beam that has been temporally profiled using a BG of the present invention (e.g., BG 200 of FIG. 2). Input beam 310 includes a plurality of spatially separated beamlets 312a, 312b, 312c, 312d, having an inclined distribution of pulse energy relative to the pulse wavefront. As is shown in FIG. 4, input beam 310 is inputted into input lens 315, focused in fiber 320, and outputted from output lens 325 as output beam 330. Lenses 315, 325 and fiber 320 have appropriate compatible numerical apertures, and fiber 320 operates as a beamlet combiner to mix and combine beamlets 312a, 312b, 312c, 312d (i.e., the spatially separated parts of beam 310) into output beam 330. As such, output beam 330 from output lens 325 has the required temporal profile (i.e., temporally profiled but not spatially separated) as schematically indicated in FIG. 4.

Figure 5:
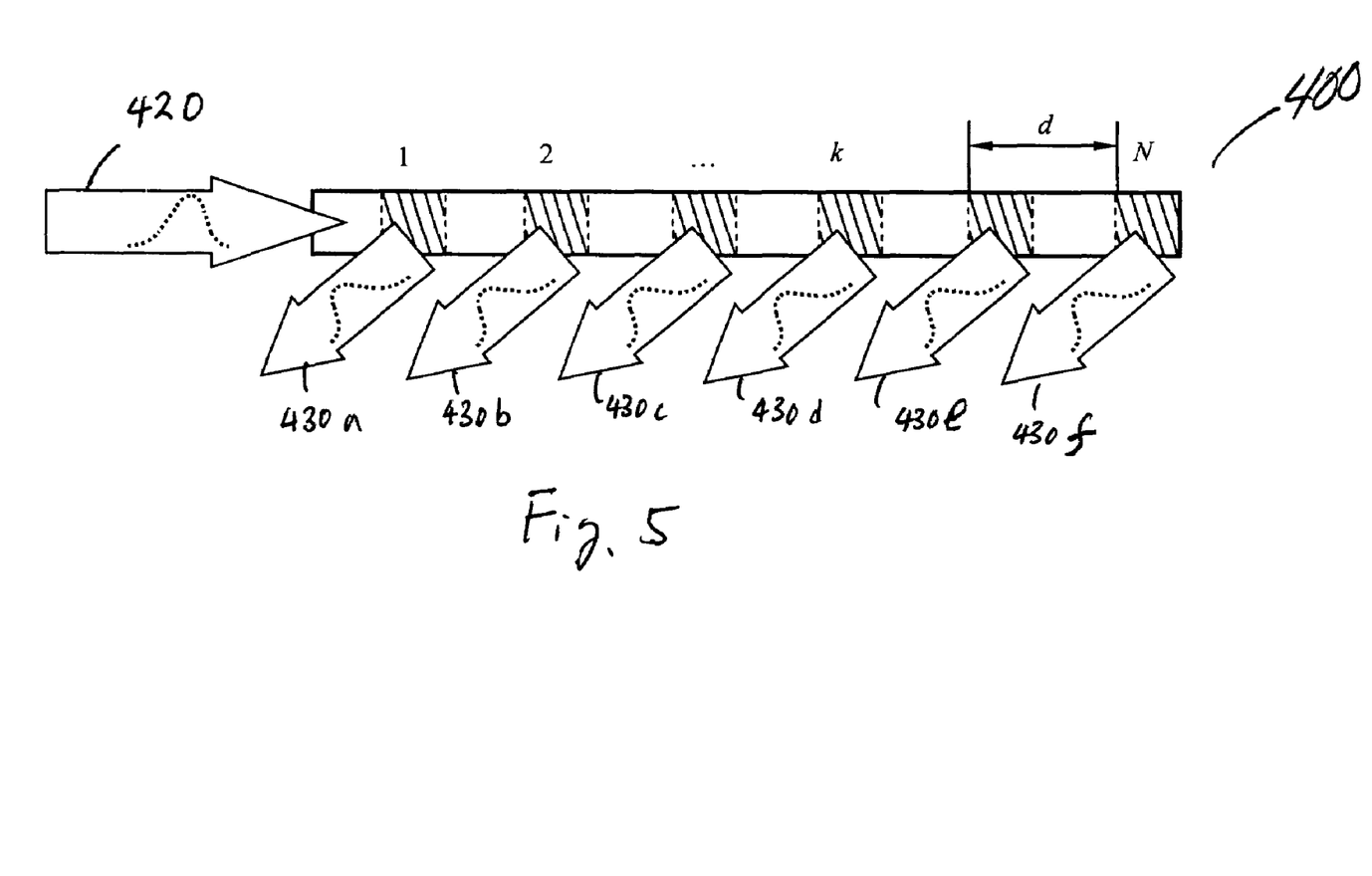
FIG. 5 is a schematic diagram of a thick BG temporal beam profiler according to another exemplary embodiment of the present invention.

Referring now to FIG. 5, in an embodiment of the present invention, thick BG 400 is used to split input laser beam 420 into a number of beamlets 430a, 430b, 430c, 430d, 430e, 430f with identical or different temporal parameters. In particular, this embodiment can be used to provide for multiple laser pulse repetitions at a certain frequency, f, and can, e.g., be useful for laser communications. The embodiment of FIG. 5 includes a number, N, of BGs. In the present embodiment, N, is equal to the required number of laser pulse repetitions at the frequency, f. The distance between the BGs, d, and the angle, α, between incident beam 420 and diffracted beamlets 430a, 430b, 430c, 430d, 430e, 430f has to provide a proper delay between diffracted pulses. As such, using equation (2), the embodiment of FIG. 5 satisfies:

$$\frac{d(n + \cos\alpha)}{c} = \frac{1}{Nf} \qquad (5)$$

where, n, is the refractive index of the BG medium.

Finally, all the BGs of FIG. 5 have such diffraction efficiencies values, η, which results in the equal intensities of diffracted beams 430a, 430b, 430c, 430d, 430e, 430f:

$$\eta(k) = \frac{1}{N - k + 1}, \qquad (6)$$

where, k, is a particular BG.

Figure 6:
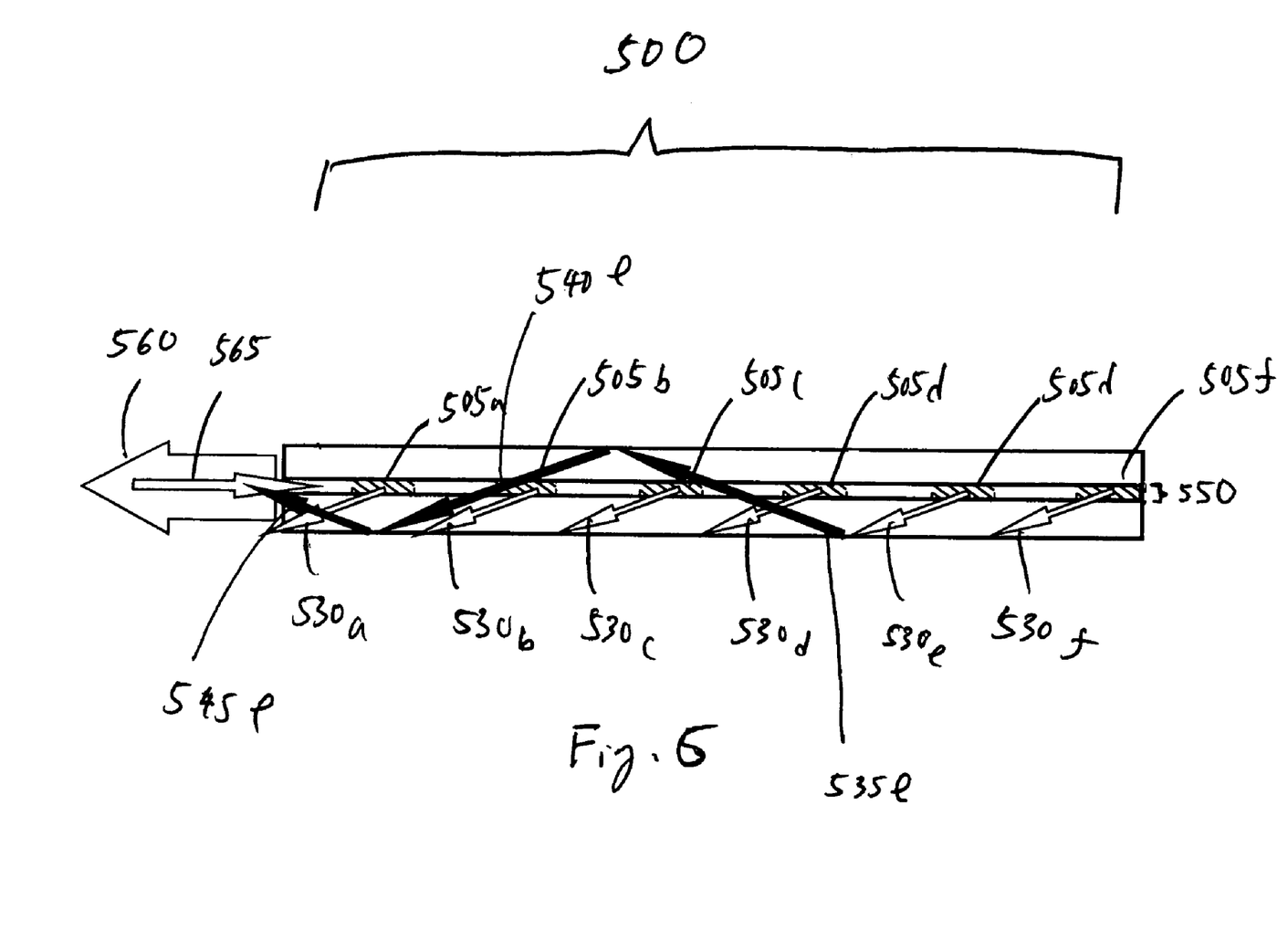
FIG. 6 is a schematic diagram of a double cladding fiber that can be used to form the thick BG temporal beam profiler according to an embodiment of the present invention.

In addition, all the above-mentioned embodiments can be formed and used within a double cladding fiber as shown in FIG. 6. Referring now to FIG. 6, double cladding fiber 500 includes BGs 505a, 505b, 505c, 505d, 505e, 505f. BGs 505a, 505b, 505c, 505d, 505e, 505f are recorded in fiber core 550 in such a way that the diffracted beamlets 530a, 530b, 530c, 530d, 530d, 530e leave the core 500 and begin to spread in the inner cladding of double cladding fiber 500 (e.g., as beamlets 530e, 535e, 540e, 545e). Of course, some part of the beamlets (e.g., beamlets 530e, 535e, 540e, 545e) may be coupled back into the core by others BGs (e.g., 505a, 505b, 505c, 505d); however, it will be a small fraction of beamlets energy which can be easily compensated by increasing the diffraction efficiency of appropriate BGs 505a, 505b, 505c, 505d, 505e, 505f. In addition, to separate output and input beams 560, 565, the embodiment of FIG. 5 may further include an optical device, such as a beam circulator (not shown).

Finally, all the above described embodiments with a proper distribution of frequency (discrete or continuous) along the BG thickness can operate as optical stretchers which increase pulse durations due to the different delay of different wavelengths. Of course, the beam temporal profiling is also possible in this case by variation of the BG's diffraction efficiency density. If the grating vectors have the same direction (in other words, if all the recorded layers of BGs are parallel to each other), all beamlets (e.g., 430a, 430b, 430c, 430d, 430e, 430f) with different wavelengths will propagate parallel to each other. This simplifies the spatial transformation of beamlets into one beam using, for example, the embodiment of FIG. 4. The embodiment of FIG. 6 provides the spatial transformation of beamlets 530a, 530b, 530c, 530d, 530d, 530e into one beam automatically. In addition, a different temporal shaping of each single wavelength can be achieved simultaneously if a few overlapped or separated BGs are recorded along the BG thickness.

In general and according to the foregoing, embodiments of the present invention allow temporal profiling of short laser pulses, are very flexible in producing different temporal shapes of output beam, and have a very high efficiency of beam conversion. In addition, embodiments of the present invention can be applied in many areas. For example, a temporal profiled laser beam outputted from embodiments of the present invention can be used in various pulsed laser systems to provide the necessary conditions for inertial confinement of nuclear fusion, to realize efficient laser processing of different materials, to compensate for gain saturation which distorts the output pulse both in solid state and fiber lasers, etc. Embodiments of the present invention can also be used for the proper shaping of the laser beams in communications or to adjust the distribution of beam intensity in time so as to maximize the efficiency of interaction with targets. In particular, certain temporal shaping embodiments of the present invention can be used in high-energy pulsed laser systems, as well as in material processing, lithography, communications and other areas requiring a special temporal profile of laser radiation.

While certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. For example, glass type and crystal type BG's have been illustrated, but it should be apparent that the inventive concepts described above would be equally applicable to other types of BGs and/or other suitable gratings. In view of the above, it will be understood that the invention is not limited to the particular embodiments or arrangements disclosed, but is rather intended to cover any changes, adaptations or modifications which are within the scope and spirit of the invention as defined by the appended claims.

What is claimed is:

1. A method for temporal beam profiling of an incident laser pulse from a source, the method comprising:
    providing a Bragg grating (BG);
    directing the incident laser pulse into the BG;
    diffracting the incident laser pulse at various depths within the BG into a plurality of diffracted beamlets having a plurality of amplitudes and time delays; and
    combining the diffracted beamlets into a single temporally shaped laser beam,
    wherein the various depths within the BG have a distribution of a refractive index modulation to provide a distribution of a diffraction efficiency density.

2. The method of claim 1, wherein the BG has a height that is not greater than a physical length of the incident laser pulse.

3. The method of claim 1, wherein a first diffracted beamlet of the plurality of diffracted beamlets has an initial time and each subsequent diffracted beamlet of the plurality of diffracted beamlets following the first diffracted beamlet has a corresponding one of the plurality of time delays as referenced with the initial time.

4. The method of claim 1, wherein the plurality of time delays are referenced with a time of a first diffracted beamlet of the plurality of diffracted beamlets diffracted from the BG.

5. The method of claim 1, wherein the diffracted beamlets are combined into the single temporally shaped laser beam using an optical fiber.

6. The method of claim 1, wherein the diffracted beamlets are combined into the single temporally shaped laser beam using a double cladding fiber.

7. The method of claim 1, wherein the diffracting the incident laser pulse at the various depths within the BG comprises fragmenting the incident laser pulse at the various depths within the BG into a plurality of diffracted pulses.

8. The method of claim 7, wherein the plurality of diffracted pulses comprises a plurality of pulse intensities and temporal shapes and wherein each of the plurality of diffracted pulses corresponds to one of the specified beam intensities and temporal shapes.

9. The method of claim 1, wherein the providing the BG comprises:
    forming a mask on a side of a photo sensitive material;
    directing at least two recording laser beams into the mask; and
    exposing the photo sensitive material to the at least two recording laser beams after the recording beams have passed through the mask,
    wherein the mask has predetermined photo-distribution characteristics to form the distribution of the diffraction efficiency density of the BG recorded in the photo sensitive material.

10. The method of claim 1, wherein the diffracting the incident laser pulse at various depths within the BG into a plurality of diffracted beamlets having a plurality of amplitudes and time delays comprises fragmenting the incident laser pulse at the various depths within the BG into a plurality of parallel diffracted beamlets.

11. A method for temporal beam profiling of an incident laser pulse from a source, the method comprising:
    providing a Bragg grating (BG);
    directing the incident laser pulse into the BG;
    diffracting the incident laser pulse at various depths within the BG into a plurality of diffracted beamlets having a plurality of amplitudes and time delays; and
    combining the diffracted beamlets into a single temporally shaped laser beam,
    wherein the various depths within the BG have a distribution of a diffraction efficiency density;
    wherein a delay, $\Delta t$, of the plurality of time delays of a diffracted beamlet of the plurality of diffracted beamlets diffracted at a depth, l, of the BG is determined by:

$$\Delta t = \frac{l}{L} \cdot \frac{L(n + \cos\alpha)}{c}$$

wherein, n, is an average refractive index of the BG, $\alpha$, is the angle between the incident laser pulse and the diffracted beamlet, c, is the light speed in the vacuum, and, L, is a total length of the BG.

12. The method of claim 11, wherein a diffraction efficiency around the depth, l, defines an amplitude of the diffracted beamlet.

13. A method for temporal beam profiling of an incident laser pulse from a source, the method comprising:
    providing a Bragg grating (BG);
    directing the incident laser pulse into the BG;
    diffracting the incident laser pulse at various depths within the BG into a plurality of diffracted beamlets having a plurality of amplitudes and time delays; and
    combining the diffracted beamlets into a single temporally shaped laser beam,
    wherein the various depths within the BG have a distribution of a diffraction efficiency density;

wherein a maximum time delay, T, of the plurality of time delays of a diffracted beamlet of the plurality of diffracted beamlets is determined by:

$$T = \frac{L(n + \cos\alpha)}{c}$$

wherein, n, is an average refractive index of the BG, α, is the angle between the incident laser pulse and the diffracted beamlet, c, is the light speed in the vacuum, and, L, is a total length of the BG.

14. A method for temporal beam profiling of an incident laser pulse from a source, the method comprising:
   providing a Bragg grating (BG);
   directing the incident laser pulse into the BG;
   diffracting the incident laser pulse at various depths within the BG into a plurality of diffracted beamlets having a plurality of amplitudes and time delays; and
   combining the diffracted beamlets into a single temporally shaped laser beam,
   wherein the various depths within the BG have a distribution of a diffraction efficiency density;
   wherein the diffracting the incident laser pulse at the various depths within the BG comprises fragmenting the incident laser pulse at the various depths within the BG into a plurality of diffracted pulses;
   wherein the incident pulse comprises a plurality of pulse wavelengths and wherein each of the plurality of diffracted pulses corresponds to one of the specified pulse wavelengths, intensities, and temporal shapes.

15. The method of claim 14, wherein the diffracted pulses overlap.

16. A system for temporal shaping of an incident laser pulse from a laser beam source, the system comprising:
   a Bragg grating (BG) coupled to receive the incident laser pulse from the laser beam source, the BG having a height that is less than the physical length of the incident laser pulse and producing a plurality of diffracted beamlets; and
   a fiber coupled to receive the diffracted beamlets and to combine the diffracted beamlets into a single temporally shaped laser beam from the incident laser pulse,
   wherein the BG has a distribution of a refractive index modulation to fragments the incident laser beam at various depths within the BG into the plurality of diffracted beamlets,
   wherein each of the plurality of diffracted beamlets has a corresponding beam amplitude and delay, and
   wherein the combination of the various beam amplitudes and delays of the diffracted beamlets provides the temporal shaped laser beam.

17. The system of claim 16, wherein the various depths within the BG comprise a distribution of a diffraction efficiency density.

18. The system of claim 17, wherein the diffraction efficiency density define the plurality of amplitudes of the diffracted beamlets.

19. The system of claim 16, wherein the plurality of diffracted beamlets comprises a plurality of parallel diffracted beamlets.

20. A system for temporal shaping of an incident laser pulse from a laser beam source, the system comprising:
   a Bragg grating (BG) coupled to receive the incident laser pulse from the laser beam source, the BG having a height that is less than the physical length of the incident laser pulse and producing a plurality of diffracted beamlets; and
   a fiber coupled to receive the diffracted beamlets and to combine the diffracted beamlets into a single temporally shaped laser beam from the incident laser pulse,
   wherein the BG fragments the incident laser beam at various depths within the BG into the plurality of diffracted beamlets,
   wherein each of the plurality of diffracted beamlets has a corresponding beam amplitude and delay, and
   wherein the combination of the various beam amplitudes and delays of the diffracted beamlets provides the temporal shaped laser beam;
   wherein the various depths within the BG comprise a distribution of a diffraction efficiency density;
   wherein the distribution of the diffraction efficiency density, H(x), is determined by:

$$H(x) = \frac{f(x)}{\int_0^1 f(x')dx' - \int_0^x f(x')dx'},$$

wherein f(x) is a functional dependence of the specified intensity distribution along a non-dimensional thickness, x=l/L, of the BG, and
   wherein l is the local depth and L is the total thickness of the BG.

21. A system for temporal beam shaping of an incident laser pulse from a laser beam source, the system comprising:
   means for directing the incident laser pulse into a Bragg grating (BG) having a height that is less than a physical length of the incident laser pulse; and
   means for fragmenting the incident laser pulse at various depths within the BG into a plurality of diffracted beamlets, wherein the various depths within the BG have a distribution of a refractive index modulation to provide a distribution of a diffraction efficiency density for temporally shaping the incident laser pulse into the plurality of diffracted beamlets;
   means for providing a corresponding intensity and delay to each of the plurality of diffracted beamlets;
   wherein a combination of the various diffracted beamlets provides a temporally shaped laser beam.

22. The system of claim 21 further comprising:
   means within the BG for filtering out spatial noises from the incident laser beam.

23. The system of claim 21, wherein the BG comprise a distribution of a diffraction efficiency density and wherein the various intensities of the diffracted beamlets are defined by the diffraction efficiency density.

* * * * *